United States Patent [19]

Nakamura et al.

[11] Patent Number: 4,707,989
[45] Date of Patent: Nov. 24, 1987

[54] MASTER CYLINDER

[75] Inventors: Kaoru Nakamura, Anjo; Shinji Sakata, Nishio; Chiaki Ochiai; Yoichi Furuta, both of Chiryu; Kaoru Tsubouchi, Toyota, all of Japan

[73] Assignee: Aisin Seiki Kabushiki Kaisha, Kariya, Japan

[21] Appl. No.: 878,662

[22] Filed: Jun. 26, 1986

[30] Foreign Application Priority Data

Jul. 2, 1985 [JP] Japan .................. 60-100857[U]

[51] Int. Cl.$^4$ ............................................. B60T 11/28
[52] U.S. Cl. .................................... 60/589; 60/562
[58] Field of Search ............... 60/562, 589, 585, 588, 60/533

[56] References Cited

U.S. PATENT DOCUMENTS

| 3,406,522 | 10/1968 | Fay | 60/589 |
|---|---|---|---|
| 4,132,073 | 1/1979 | Ewald | 60/589 |
| 4,267,697 | 5/1981 | Hodkinson | 60/589 |
| 4,313,302 | 2/1982 | Farr | 60/589 |
| 4,384,458 | 5/1983 | Kawaguchi | 60/589 |
| 4,516,400 | 5/1985 | Tarplee | 60/589 |
| 4,550,567 | 11/1985 | Schaefer | 60/589 |
| 4,598,955 | 7/1986 | Belart | 60/562 |
| 4,621,498 | 11/1986 | Schaefer | 60/589 |

FOREIGN PATENT DOCUMENTS 1102929 2/1968 United Kingdom ............... 60/562

Primary Examiner—Abraham Hershkovitz
Attorney, Agent, or Firm—Oblon, Fisher, Spivak, McClelland, & Maier

[57] ABSTRACT

A piston defines in a cylinder housing a pressure chamber connected to a brake pipe and a fluid supply chamber connected to an oil reservoir. The piston has a recess facing the pressure chamber at one end thereof. A valve member is provided in the recess for making or breaking fluid communication between the pressure chamber and the oil reservoir through the supply chamber. A compression spring is disposed in the recess for urging the valve member into its closed position. A spring retainer is fitted about the end of the piston for holding the spring in the recess. A supporting member is provided in the housing on the opposite side of the pressure chamber from the piston. The valve member is supported by a connecting rod extending axially movably through the spring retainer and the supporting member. A compression spring is connected between the spring retainer and the supporting member for urging the connecting rod in the direction which causes the valve member to open. The spring retainer is movable axially of the piston, while the supporting member is fixed to the housing.

6 Claims, 1 Drawing Figure

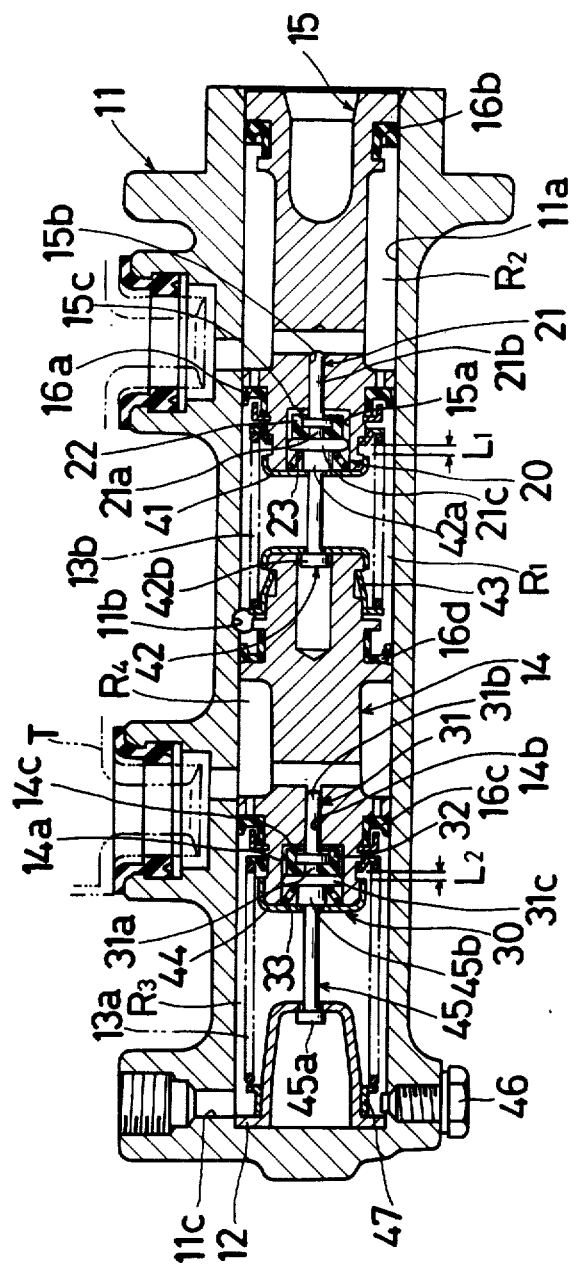

MASTER CYLINDER

BACKGROUND OF THE INVENTION

1. Field of the Invention:

This invention relates to a master cylinder which is used with a hydraulic brake system for an automobile. More particularly, it comprises a master cylinder of the portless type having a piston provided with a valve mechanism for establishing or breaking communication between a pressure chamber and an oil reservoir.

2. Description of the Prior Art:

The demand for automobiles of high class has been increasing. As a result, many automobiles now have a brake system provided with an anti-skid device. There is known an anti-skid device of the type which causes a hydraulic fluid to flow back from the wheel cylinders to the pressure chamber in the master cylinder through a pump when the wheels are locked.

There is also known a master cylinder having a primary cup fitted about a piston for opening or closing a compensating port between a pressure chamber and an oil reservoir. A problem is very likely to arise if a brake system including a master cylinder of this type is provided with an anti-skid device of the type as hereinabove described. If the brake pedal is again depressed before it returns to its original position, hydraulic fluid causes the primary cup to flex and flows into the pressure chamber. This fluid produces in the pressure chamber a residual pressure which prevents smooth restoration of the brake pedal to its original position. The repeated use of the brake system gives rise to unreasonably quick wear of the primary cup.

Another type of master cylinder is, therefore, known. Such is of the portless type not having any such compensating port, but which includes a valve mechanism provided on a piston for making or breaking communication between a pressure chamber and an oil reservoir.

A master cylinder of the portless type is shown in Laid-Open British patent application GB No. 2 098 294 A. It includes a piston fitted slidably in a liquid-tight fashion in the bore of a cylinder housing and defining therein a pressure chamber normally in communication with oil pipes leading to wheel cylinders and a fluid supply chamber normally in communication with an oil reservoir. The piston has at one end thereof a recess facing the pressure chamber. A valve seat is provided at the bottom of the recess. A valve member is provided in the recess and is movable axially of the piston away from, or into, contact with the valve seat for establishing or breaking communication between the pressure chamber and the oil reservoir. A first compression spring is provided in the recess for urging the valve member toward the valve seat. A supporting member is connected to the valve member and disposed at the bottom of the pressure chamber. A retainer is fitted on the end of the piston. A connecting rod extends through the supporting member and the retainer and is movable by a predetermined distance axially of the piston. A second compression spring is disposed between the supporting member and the retainer for urging them away from each other to cause the connecting rod to engage them to move the valve member away from the valve seat by a predetermined distance.

Another master cylinder of the portless type is disclosed in Japanese Laid-Open patent specification No. 102762/1980. It includes a piston which is substantially identical in construction to the piston disclosed in the British application hereinabove referred to. A valve rod is connected to the piston and is movable axially of the piston. The valve rod is provided with a valve member which is movable away from, or into, contact with the valve seat on the piston for making or breaking communication between the pressure chamber and the oil reservoir. A compression spring is provided for urging the valve member toward the valve seat. The piston has an axially elongated hole. A stopper pin extends through the hole and is fixed to the cylinder housing. When the piston is in its inoperative position, the pin engages the end of the leg of the valve rod to move the valve member away from the valve seat by overcoming the force of the spring.

Both of these master cylinders are, however, still unsatisfactory. It is often the case that the residual pressure produced in the pressure chamber as hereinbefore stated may cause the valve member to be stretched elastically and stay at rest on the valve seat, even when the piston is brough back to its inoperative position. If the valve remains closed, the residual fluid cannot be released from the pressure chamber, but disables the brake system so as to be deactuated completely. This problem may be solved if the valve member and the valve seat have a greater distance therebetween when the piston is in its inoperative position. This solution, however, results in an increased idle stroke of the piston and therefore of the brake pedal.

The master cylinder disclosed in the Japanese application has still another disadvantage. The presence of the stopper pin complicates the work of assembling and disassembling the master cylinder. The circumferential position of the piston is critical to ensure the alignment of its elongated hole with the pin. The pin must be removed when the piston or other parts of the master cylinder are changed.

SUMMARY OF THE INVENTION

It is an object of this invention to provide an improved master cylinder for a hydraulic brake system which can overcome the drawbacks of the prior art as hereinabove pointed out.

This object is attained by a master cylinder which is an improvement in the master cylinder hereinbefore described with reference to the British application, and which is characterized in that the retainer is movable by a predetermined distance axially of the piston, while the supporting member is fixed to the cylinder housing.

If any residual pressure exists in the pressure chamber even after restoration of the piston to its inoperative position when the brake pedal has been depressed twice successively, the movable retainer permits the relative movement of the piston by a predetermined distance away from the retainer. The relative movement of the piston increases the distance between the valve member connected to the connecting rod and the valve seat on the piston correspondingly. Even if the valve member may be stretched, it is moved away from the valve seat to establish communication between the pressure chamber and the oil reservoir. Thus, the master cylinder of this invention ensures that the valve be opened on any such occasion so as to allow the pressure chamber to release any residual fluid that would otherwise prevent complete deactuation of the brake system.

BRIEF DESCRIPTION OF THE DRAWING

The sole FIGURE is a longitudinal sectional view of a tandem master cylinder embodying this invention.

DESCRIPTION OF THE PREFERRED EMBODIMENT

Referring to the drawing, there is shown a tandem master cylinder of the portless type embodying this invention which is used with a hydraulic brake system for an automobile. A cylinder housing 11 has an axial bore 11a in which a supporting member or stop sleeve 12, a secondary return spring 13a, a secondary piston 14, a primary return spring 13b and a primary piston 15 are disposed one after another from one end thereof to the other.

A primary cup 16a and a secondary cup 16b are fitted about the primary piston 15 adjacent to its opposite ends, respectively, to position it axially slidably in a liquid-tight fashion. The primary and secondary pistons 15 and 14 define a primary pressure chamber $R_1$ therebetween. The primary and secondary cups 16a and 16b define a primary fluid supply chamber $R_2$ therebetween. The cylinder housing 11 has an outlet port 11b through which the pressure chamber $R_1$ is normally in communication with one of the oil pipelines leading to the front and rear wheels. The supply chamber $R_2$ is normally in communication with an oil reservoir T. A primary valve mechanism 20 is provided on the primary piston 15. The primary return spring 13b is disposed between the primary piston 15 and the secondary piston 14.

A primary cup 16c and a secondary cup 16d are fitted about the secondary piston 14 to position it axially slidably in a liquid-tight fashion. The secondary piston 14 and the bottom of the bore 11a define a secondary pressure chamber $R_3$ therebetween. The primary and secondary cups 16c and 16d define a secondary fluid supply chamber $R_4$ therebetween. The cylinder housing 11 has another outlet port 11c, too. The pressure chamber $R_3$ is normally in communication with the other oil pipeline through the outlet port 11c. The supply chamber $R_4$ is normally in communication with another oil reservoir T. A secondary valve mechanism 30 is provided on the secondary piston 14. The secondary return spring 13a is disposed between the supporting member 12 and the secondary piston 14.

The primary piston 15 has a recess 15a at its end facing the pressure chamber $R_1$ and an axial hole 15b which is coaxial with the recess 15a. The recess 15a has a bottom defining a valve seat 15c. The primary valve mechanism 20 is provided in the recess 15a for making or breaking communication between the pressure chamber $R_1$ and the supply chamber $R_2$. It comprises a valve rod 21, a valve member 22 and a compression spring 23. The valve rod 21 has a neck 21a about which the valve member 22 is fitted, a leg 21b extending slidably into the axial hole 15b of the piston 15 and a head 21c located on the opposite side of the neck 21a from the leg 21b. The axial hole 15b is provided for establishing communication between the pressure chamber $R_1$ and the supply chamber $R_2$. The valve member 22 is made of rubber and faces the valve seat 15c. It is movable away from, or into, contact with the valve seat 15c for making or breaking communication between the pressure chamber $R_1$ and the supply chamber $R_2$. A spring retainer 41 is provided at the end of the piston 15 and extends over its recess 15a. The compression spring 23 is disposed between the head 21c of the valve rod 21 and the spring retainer 41 for urging the valve member 22 toward the valve seat 15c.

A connecting rod 42 is coaxial with the valve rod 21 and has an enlarged end 42a joined to the head 21c of the valve rod 21. A spring retainer 43 is provided at the end of the secondary piston 14 facing the primary piston 15 and faces the spring retainer 41 on the piston 15. The connecting rod 42 extends movably through the spring retainers 41 and 43 and has another enlarged end 42b positioned in the piston 14. The enlarged ends 42a and 42b of the connecting rod 42 are engageable with the inner surfaces of the spring retainers 41 and 43, respectively. The spring retainer 41 is axially movable by a certain distance $L_1$ relative to the primary piston 15, while the spring retainer 43 is fixed to the secondary piston 14. The return spring 13b is interposed between the spring retainers 41 and 43.

The return spring 13b is a compression spring which urges the pistons 14 and 15 away from each other so that the enlarged ends 42a and 42b of the connecting rod 42 may engage the spring retainers 41 and 43, respectively. Thus, the valve member 22 is spaced apart from the valve seat 15c by overcoming the force of the compression spring 23 for making communication between the pressure chamber $R_1$ and the supply chamber $R_2$. If the primary piston 15 is moved by overcoming the force of the return spring 13b, the connecting rod 42 is axially moved and the compression spring 23 brings the valve member 22 into contact with the valve seat 15c for breaking the communication between the pressure chamber $R_1$ and the supply chamber $R_2$.

The secondary piston 14 has an axial recess 14a at its end facing the secondary pressure chamber $R_3$ an axial hole 14b which is coaxial with the recess 14a. The recess 14a has a bottom defining a valve seat 14c. The secondary valve mechanism 30 is provided in the recess 14a for establishing or breaking communication between the secondary pressure chamber $R_3$ and the secondary fluid supply chamber $R_4$. Such comprises a valve rod 31, a valve member 32 and a compression spring 33. The valve rod 31 has a neck 31a about which the valve member 32 is fitted, a leg 31b extending slidably into the axial hole 14b of the piston 14 and a head 31c located on the opposite side of the neck 31a from the leg 31b. The valve member 32 is made of rubber and faces the valve seat 14c. It is axially movable away from, or into, contact with the valve seat 14c for establishing or breaking communication between the pressure chamber $R_3$ and the supply chamber $R_4$. A spring retainer 44 is provided at the end of the piston 14 and extends over its recess 14a. The compression spring 33 is disposed in the recess 14a between the head 31c of the valve rod 31 and the spring retainer 44 for urging the valve member 32 toward the valve seat 14c.

A connecting rod 45 is coaxial with the valve rod 31 and has an enlarged end 45a positioned within the supporting member 12. It has another enlarged end 45b joined to the head 31c of the valve rod 31. The rod 45 extends movably through the supporting member 12 and the spring retainer 44 and the opposite ends 45a and 45b thereof are engageable with the inner surfaces of the supporting member 12 and the spring retainer 44, respectively. The supporting member 12 is removably held at the bottom of the bore 11a of the cylinder housing 11 by a stopper bolt 46 which is threadedly passed through the wall of the housing 11. A spring retainer 47 is fitted about the supporting member 12. The spring retainer 44 which is provided on the secondary piston 14 is axially movable by a certain distance $L_2$ relative to the piston 14. The secondary return spring 13a is interposed between the spring retainers 44 and 47.

The return spring 13a comprises a compression spring which urges the secondary piston 14 away from the supporting member 12 so as to cause the opposite ends 45a and 45b of the connecting rod 45 to engage the supporting member 12 and the spring retainer 44, respectively. Thus, the valve member 32 is spaced apart from the valve seat 14c by overcoming the force of the compression spring 33 for establishing communication between the pressure chamber $R_3$ and the supply chamber $R_4$. If the secondary piston 14 is moved by overcoming the force of the return spring 13a, the connecting rod 45 is axially moved and the compression spring 33 brings the valve member 32 into contact with the valve seat 14c for breaking the communication between the pressure chamber $R_3$ and the supply chamber $R_4$.

The actuating rod of a brake booster is connected to the rear end of the primary piston 15, though not shown. If the brake pedal is depressed, the piston 15 is moved to the left as viewed in the drawing by overcoming the force of the return spring 13b. The valve member 22 rests on the valve seat 15c to break the communication between the pressure chamber $R_1$ and the supply chamber $R_2$ so that the fluid in the pressure chamber $R_1$ may have an elevated pressure. The elevated fluid pressure is transmitted to one of the brake pipes and simultaneously moves the secondary piston 14 to the left by overcoming the force of the return spring 13a. As a result, the valve member 32 rests on the valve seat 14c to break communication between the pressure chamber $R_3$ and the supply chamber $R_4$ so that the fluid in the pressure chamber $R_3$ may have an elevated pressure. The elevated fluid pressure is transmitted to the other brake pipe, whereupon all of the front and rear wheels are braked. If depression of the brake pedal is discontinued, the return springs 13a and 13b return the pistons 14 and 15 to their respective inoperative positions. The pressure chambers $R_1$ and $R_3$ are communicated again with the supply chambers $R_2$ and $R_4$, respectively, and the pressure of the fluid in each of the pressure chambers $R_1$ and $R_3$ becomes equal to that of the fluid in the oil reservoir T.

If the brake pedal is depressed again before it returns completely to its original position it is likely that the fluid may cause one or both of the primary cups 16a and 16c to flex and flow from one or both of the supply chambers $R_2$ and $R_4$ into one or both of the pressure chambers $R_i$ and $R_3$. The fluid is likely to produce a residual pressure in one or both of the pressure chambers $R_1$ and $R_3$ and thereby force one or both of the valve mechanisms 20 and 30 to close when the brake pedal has returned to its original position. As a result, the brake system may fail to be fully deactuated. The master cylinder of this invention provides an effective solution to any such problem, as will hereunder be described.

In the master cylinder of this invention, the spring retainers 41 and 44 are axially movable by the specific distances $L_1$ and $L_2$ relative to the pistons 15 and 14, respectively, as hereinabove described. If any residual pressure existing in the pressure chamber $R_1$ is likely to force the valve member 22 to rest on the valve seat 15c, the piston 15 is moved to the right as viewed in the drawing, or the piston 14 to the left, by the distance $L_1$ for disengaging the valve member 22 from the valve seat 15c and thereby communicating the pressure chamber $R_1$ with the supply chamber $R_2$. If any residual pressure existing in the pressure chamber $R_3$ is likely to force the valve member 32 to rest on the valve seat 14c, the piston 14 is moved to the right by the distance $L_2$ for disengaging the valve member 32 from the valve seat 14c and thereby communicating the pressure chamber $R_3$ with the supply chamber $R_4$. If any residual pressure is likely to exist in both of the pressure chambers $R_1$ and $R_3$ and force the valve members 22 and 32 to rest on the valve seats 15c and 14c, respectively, the pistons 15 and 14 are moved to the right by the distances $L_1$ and $L_2$, respectively, for communicating the pressure chambers $R_1$ and $R_3$ with the supply chambers $R_2$ and $R_4$, respectively. Therefore, neither valve mechanisms is undesirably closed to leave in the pressure chamber $R_1$ or $R_3$ any residual pressure that is likely to prevent the proper deactuation of the brake system.

In the master cylinder of this invention, the connecting rods 42 and 45 connect the pistons 14 and 15, the supporting member 12 and the valve mechanisms 20 and 30 together to form a unitary assembly which is easy to installed in the bore 11a of the cylinder housing 11 or removed therefrom. Insofar as the supporting member 12 forms a part of the unitary assembly, the stopper bolt 46 associated with the supporting member 12 serves to hold the whole assembly in position within the bore 11a of the cylinder housing 11 without the aid of any other special holding means. The whole assembly can thus be removed from the bore 11a if the bolt 46 is loosened.

As the legs 21b and 31b of the valve rods 21 and 31 are disposed in the axial holes 15b and 14b of the pistons 15 and 14, respectively, the valve rods 21 and 31 are properly guided when they are axially moved. Therefore, the valve members 22 and 32 are properly guided into proper sealing contact with the valve seats 15c and 14c, respectively.

Although the invention has been described as applied to a tandem master cylinder, it is, of course, applicable to a master cylinder having only a single piston, too. It will be easy to obtain such a master cylinder by, for example, eliminating the primary piston 15, the valve mechanism 20 and the return spring 13b from the device which has hereinabove been described with reference to the drawing.

What is claimed as new and desired to be secured by Letters Patent of the United States is:

1. A master cylinder for a hydraulic brake system comprising:
 a housing having an axial bore, at least one piston fitted in said bore slidably in a liquid-tight fashion and defining in said bore a pressure chamber normally in fluid communication with a brake pipe and a fluid supply chamber normally in fluid communication with an oil reservoir, said piston having at one end thereof an axial recess facing said pressure chamber and having a bottom defining a valve seat, a valve member fitted in said recess movable axially of said piston away from, or into, contact with said valve seat for making or breaking fluid communication between said pressure chamber and said oil reservoir, a spring retainer fitted about said one end of said piston, a first compression spring held in said recess by said spring retainer for urging said valve member toward said valve seat, a supporting member provided in said bore on the opposite side of said pressure chamber from said piston, a connecting rod connected to said valve member and extending through said spring retainer and said supporting member and movably axially of said piston, and a second compression spring provided between said spring retainer and said supporting member for urging them away from each other to cause said connecting rod to engage said spring retainer and said supporting member to thereby move said valve member away from said valve seat, wherein said spring retainer is movable in normal operation axially by a certain distance relative to said piston so as to increase the distance between said valve member and said valve seat and to allow release of any residual fluid in the pressure chamber and wherein said supporting member is fixed to said housing.

2. A master cylinder as set forth in claim 1, wherein said piston, said valve member and said supporting member are connected by said connecting rod to constitute a unitary assembly.

3. A master cylinder as set forth in claim 2, further including a bolt which is threadedly engaged through a wall portion of said housing for securing said supporting member to said housing to thereby position all of the parts constituting said assembly in said bore.

4. A master cylinder as set forth in claim 1, wherein said valve member is made of rubber and said connecting rod has a portion located in said piston and defining a valve rod having a neck located in said recess, said valve member being fitted about said neck.

5. A master cylinder as set forth in claim 4, wherein said piston has an axial hole connected to said recess coaxially therewith and said valve rod has a leg extending from said neck and disposed slidably in said hole.

6. A master cylinder as set forth in claim 1, wherein the moving direction of said spring retainer relative to said piston is such that said valve member moves away from said valve seat.

* * * * *

UNITED STATES PATENT AND TRADEMARK OFFICE
CERTIFICATE OF CORRECTION

PATENT NO. :  4,707,989

DATED      :  Nov. 24, 1987

INVENTOR(S) :  NAKAMURA et al.

It is certified that error appears in the above-identified patent and that said Letters Patent is hereby corrected as shown below:

Column 2, line 21, change "brough" to --brought--; at Column 4, line 33, after "$R_3$" insert --and--; at Column 5, line 46, insert a comma after "piston"; and at Column 6, line 22, after "easy to" insert --be--.

Signed and Sealed this

Fourteenth Day of June, 1988

Attest:

DONALD J. QUIGG

*Attesting Officer*

*Commissioner of Patents and Trademarks*